US012573371B2

(12) United States Patent
Gemp et al.

(10) Patent No.: US 12,573,371 B2
(45) Date of Patent: Mar. 10, 2026

(54) VOCABULARY SELECTION FOR TEXT PROCESSING TASKS USING POWER INDICES

(71) Applicant: GDM Holding LLC, Mountain View, CA (US)

(72) Inventors: Ian Michael Gemp, London (GB); Yoram Bachrach, London (GB); Roma Patel, Providence, RI (US); Christopher James Dyer, London (GB)

(73) Assignee: GDM HOLDING LLC, Mountain View, CA (US)

( * ) Notice: Subject to any disclaimer, the term of this patent is extended or adjusted under 35 U.S.C. 154(b) by 236 days.

(21) Appl. No.: 18/038,631

(22) PCT Filed: Nov. 22, 2021

(86) PCT No.: PCT/EP2021/082488

§ 371 (c)(1),
(2) Date: May 24, 2023

(87) PCT Pub. No.: WO2022/112167

PCT Pub. Date: Jun. 2, 2022

(65) Prior Publication Data

US 2024/0013769 A1 Jan. 11, 2024

Related U.S. Application Data

(60) Provisional application No. 63/117,953, filed on Nov. 24, 2020.

(51) Int. Cl.
*G10L 13/047* (2013.01)
*G10L 13/08* (2013.01)

(52) U.S. Cl.
CPC ............ *G10L 13/047* (2013.01); *G10L 13/08* (2013.01)

(58) Field of Classification Search
CPC ........ G10L 13/047; G10L 13/08; G06F 40/30
See application file for complete search history.

(56) References Cited

U.S. PATENT DOCUMENTS

| | | | | |
|---|---|---|---|---|
| 10,650,667 | B1 * | 5/2020 | Afghah | A61B 5/0022 |
| 2015/0200962 | A1 * | 7/2015 | Xu | H04L 63/1483<br>726/23 |
| 2018/0121817 | A1 * | 5/2018 | Datta | G06N 5/046 |

OTHER PUBLICATIONS

Adadi et al., "Peeking inside the black-box: a survey on explainable artificial intelligence (XAI)," IEEE access, Sep. 16, 2018, 6:52138-60.

Bachrach et al., "Approximating power indices: theoretical and empirical analysis," Autonomous Agents and Multi-Agent Systems, Mar. 2010, 20:105-22.

(Continued)

*Primary Examiner* — Daniel C Washburn
*Assistant Examiner* — Penny L Caudle
(74) *Attorney, Agent, or Firm* — Gray Ice Higdon

(57) ABSTRACT

Methods, systems, and apparatus, including computer programs encoded on computer storage media, for selecting an input vocabulary for a machine learning model using power indices. One of the methods includes computing a respective score for each of a plurality of text tokens in an initial vocabulary and then selecting the text tokens in the input vocabulary based on the respective scores.

22 Claims, 3 Drawing Sheets

(56) References Cited

OTHER PUBLICATIONS

Bahdanau et al., "Learning to compute word embeddings on the fly," CoRR, submitted on Jun. 1, 2017, arXiv:1706.00286, 12 pages.
Bilbao et al., "Voting power in the European Union enlargement," European Journal of Operational Research, Nov. 16, 2002, 143(1):181-96.
Bowman et al., "A large annotated corpus for learning natural language inference," CoRR, submitted on Aug. 21, 2015, arXiv:1508.05326v1, 11 pages.
Banzhaf, "Weighted voting doesn't work: A mathematical analysis," Rutgers Law Review, 1964, 19:317 (abstract only).
Chen et al., "How large a vocabulary does text classification need? a variational approach to vocabulary selection," CoRR, submitted on Apr. 3, 2019, arXiv:1902.10339v4, 11 pages.
Datta et al., "Algorithmic transparency via quantitative input influence: Theory and experiments with learning systems," In 2016 IEEE symposium on security and privacy (SP), May 22, 2016, p. 598-617.
Dubey et al., "Mathematical properties of the Banzhaf power index," Mathematics of Operations Research, May 1979, 4(2):99-131 (abstract only).
Dubey, "On the uniqueness of the Shapley value," International Journal of Game Theory, Sep. 1975, 4:131-9 (abstract only).
Elkind et al., "Computational complexity of weighted threshold games," In AAAI, Jul. 22, 2007, p. 718-723.
Faruqui et al., "Sparse overcomplete word vector representations," CoRR, submitted on Jun. 5, 2015, arXiv:1506.02004v1, 10 pages.
Fatima et al., "A linear approximation method for the Shapley value," Artificial Intelligence, Sep. 1, 2008, 172(14):1673-99.
Friedman et al., "Regularization paths for generalized linear models via coordinate descent," Journal of statistical software, 2010, 33(1):1.
Gilpin et al., "Explaining explanations: An overview of interpretability of machine learning," In 2018 IEEE 5th International Conference on data science and advanced analytics (DSAA), Oct. 1, 2018, p. 80-89.
Han et al., "Deep compression: Compressing deep neural networks with pruning, trained quantization and huffman coding," CoRR, submitted on Feb. 15, 2016, arXiv:1510.00149v5, 14 pages.
Hubara et al., "Quantized neural networks: Training neural networks with low precision weights and activations," The Journal of Machine Learning Research, 18(1):6869-6898 (2018).
International Preliminary Report on Patentability in Appln. No. PCT/EP2021/082488, mailed on Jun. 8, 2023, 7 pages.
International Search Report and Written Opinion in Appln. No. PCT/EP2021/082488, mailed on Feb. 24, 2022, 12 pages.
Kim et al., "Character-aware neural language models," In Proceedings of the AAAI conference on artificial intelligence, Mar. 5, 2016, 9 pages.
Kudo et al., "Sentencepiece: A simple and language independent subword tokenizer and detokenizer for neural text processing," CoRR, submitted on Aug. 19, 2018, arXiv:1808.06226v1, 6 pages.
Le et al., "A simple way to initialize recurrent networks of rectified linear units," CoRR, submitted on Apr. 7, 2015, arXiv:1504.00941v2, 9 pages.
Lee et al., "Fully character-level neural machine translation without explicit segmentation," Transactions of the Association for Computational Linguistics, Oct. 1, 2017, 5:365-78.
L'Hostis et al., "Vocabulary selection strategies for neural machine translation," CoRR, submitted on Oct. 1, 2016, arXiv:1610.00072v1, 9 pages.
Ling et al., "Character-based neural machine translation," CoRR, submitted on Nov. 14, 2015, arXiv:1511.04586v1, 11 pages.
Lundberg et al., "A unified approach to interpreting model predictions," In Advances in neural information processing systems, submitted on Nov. 25, 2017, p. 4765-4774.
Lundberg et al., "From local explanations to global understanding with explainable AI for trees," Nature machine intelligence, Jan. 2020, 2(1):56-67.
Maleki et al., "Bounding the estimation error of sampling-based Shapley value approximation," CoRR, submitted on Feb. 12, 2014, arXiv:1306.4265v2, 14 pages.
Matsui et al., "A survey of algorithms for calculating power indices of weighted majority games," Journal of the Operations Research Society of Japan, 2000, 43(1):71-86.
Matsui et al., "Np-completeness for calculating power indices of weighted majority games," Theoretical Computer Science, Jul. 28, 2001, 263(1-2):305-310.
Meinshausen et al., "Stability selection," Journal of the Royal Statistical Society Series B: Statistical Methodology, Sep. 2010,72(4):417-73.
Molchanov et al., "Variational dropout sparsifies deep neural networks," In International Conference on Machine Learning, Jul. 17, 2017, p. 2498-2507.
Neklyudov et al., "Structured bayesian pruning via log-normal multiplicative noise," Advances in Neural Information Processing Systems, 2017, 10 pages.
Nimon et al., "Understanding the results of multiple linear regression: Beyond standardized regression coefficients," Organizational Research Methods, Oct. 2013, 16(4):650-74.
Provilkov et al., "Bpe-dropout: Simple and effective subword regularization," CoRR, submitted on May 1, 2020, arXiv:1910.13267v2, 11 pages.
Qian et al., "Human Versus Machine and Human-Machine teaming on Masked Language Modeling Tasks," Computer Vision, Oct. 17, 2020, 12 pages.
Radev et al., "Evaluating web-based question answering systems," In LREC, May 2002, 4 pages.
Ramos, "Using tf-idf to determine word relevance in document queries," In Proceedings of the first instructional conference on machine learning, Dec. 3, 2003, 242(1):29-48.
Schmeidler et al., "The nucleolus of a characteristic function game," SIAM Journal on applied mathematics, 17(6):1163-1170 (partial) (1969).
Sennrich et al., "Neural machine translation of rare words with subword units," CoRR, submitted on Jun. 10, 2016, arXiv:1508.07909v5, 11 pages.
Shapley, "A value for n-person games," Contributions to the Theory of Games, 1953, 2(28):307-317.
Shi et al., "Speeding up neural machine translation decoding by shrinking run-time vocabulary," In Proceedings of the 55th Annual Meeting of the Association for Computational Linguistics (vol. 2: Short Papers), Jul. 2017, p. 574-579.
Socher et al., "Recursive deep models for semantic compositionality over a sentiment treebank," In Proceedings of the 2013 conference on empirical methods in natural language processing, Oct. 2013, p. 1631-1642.
Strafiin, "The Shapley-Shubik and Banzhaf power indices as probabilities," The Shapley value: essays in honor of Lloyd S. Shapley, Oct. 28, 1988, p. 71.
Tjandra et al., "Compressing recurrent neural network with tensor train," In 2017 International Joint Conference on Neural Networks (IJCNN), May 14, 2017, p. 4451-4458.
Wang et al., "Glue: A multi-task benchmark and analysis platform for natural language understanding," CoRR, submitted on Feb. 22, 2019, arXiv:1804.07461v3, 20 pages.
Warstadt et al., "Neural network acceptability judgments," Transactions of the Association for Computational Linguistics, Sep. 1, 2019, 7:625-41.
Wen et al., "Learning structured sparsity in deep neural networks," Advances in neural information processing systems, 2016, 9 pages.
Yogatama et al., "Learning word representations with hierarchical sparse coding," In International Conference on Machine Learning, Jun. 1, 2015, p. 87-96.
Zhang et al., "Character-level convolutional networks for text classification," In Advances in neural information processing systems, 2015, 9 pages.

* cited by examiner

VOCABULARY SELECTION FOR TEXT PROCESSING TASKS USING POWER INDICES

CROSS-REFERENCE TO RELATED APPLICATIONS

This application is a National Stage Application under 35 U.S.C. § 371 and claims the benefit of International Application No. PCT/EP2021/082488, filed Nov. 22, 2021, which claims the benefit of priority to U.S. Provisional Application No. 63/117,953, filed Nov. 24, 2020, the entirety of which is incorporated herein by reference.

BACKGROUND

This specification relates to training machine learning models to perform text processing tasks.

Machine learning models receive an input and generate an output, e.g., a predicted output, based on the received input. Some machine learning models are parametric models and generate the output based on the received input and on values of the parameters of the model. Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that selects an input vocabulary for a machine learning model that will be trained to perform one or more text processing tasks.

According to an aspect, there is provided a method performed by one or more computers, the method comprising: obtaining a training data set comprising a plurality of text segments in one or more natural languages, each text segment comprising one or more text tokens that are each selected from an initial vocabulary of text tokens in the one or more natural languages. The method further comprises selecting an input vocabulary for a first machine learning model to be trained on the training data set to perform one or more text processing tasks, wherein the input vocabulary is a proper subset of the text tokens in the initial vocabulary, and wherein the text tokens in the input vocabulary are represented as unique tokens in inputs to the first machine learning model.

The selecting comprises, for each particular text token of a plurality of text tokens in the initial vocabulary: generating a plurality of first candidate input vocabularies that do not include the particular text token.

For each of the plurality of first candidate input vocabularies, generating a corresponding second input vocabulary that includes (i) the text tokens in the first candidate input vocabulary and (ii) the particular text token.

For each of the plurality of first candidate input vocabularies, training a second machine learning model to perform the one or more text processing tasks on at least a portion of the training data set with an input vocabulary for the second machine learning model set to the first candidate input vocabulary.

For each of the plurality of second candidate input vocabularies, training the second machine learning model to perform the one or more text processing tasks on at least a portion of the training data set with the input vocabulary for the second machine learning model set to the second candidate input vocabulary.

The selecting further comprises, determining a score for the particular text token that measures a difference between (i) the performance on the one or more text processing tasks of the second machine learning model when trained with the plurality of first candidate input vocabularies that do not include the particular text token and (ii) the performance on the one or more text processing tasks of the second machine learning model when trained with the plurality of second candidate input vocabularies that do include the particular text token; and selecting the input vocabulary based on the scores for the particular text tokens.

The method may comprise the following features.

The text tokens may be words or subwords. The text tokens in the initial vocabulary that are not in the input vocabulary may all be represented as a single, shared token in inputs to the first machine learning model.

The first machine learning model may be configured to receive a model input comprising an input text segment and to process the model input to generate an output for the one or more text processing tasks, and wherein: any text tokens in the input text segment that are in the input vocabulary are represented as unique tokens in the model input; and any text tokens in the input text segment that are not in the input vocabulary are represented as the single, shared token in the model input.

The method may further comprise training the first machine learning model to perform the one or more text processing tasks on at least a portion of the training data set with the input vocabulary for the first machine learning model set to the selected input vocabulary.

The method may further comprise providing data specifying the trained first machine learning model and the selected input vocabulary for use in generating outputs for the one or more text processing tasks for new text segments that are not in the training data set.

The method may further comprise selecting the plurality of tokens from the initial vocabulary by filtering out one or more tokens from the text tokens in the initial vocabulary.

Filtering out one or more text tokens may comprise ranking the text tokens based on one or more heuristics; and selecting a threshold number of text tokens based on the ranking.

The one or more heuristics may include one or more of: term frequency (TF), term frequency—inverse document frequency (TF-IDF), or coefficients assigned to the text tokens in a linear regression model trained with regularization.

Generating a plurality of first candidate input vocabularies that do not include the particular text token may comprise generating each first candidate input vocabulary by: assigning a probability p to each of the plurality of text tokens in the initial vocabulary; and selecting each of the plurality of tokens for inclusion in the first candidate input vocabulary with probability p. The probability assigned to each of the plurality of tokens may be 0.5.

Generating a plurality of first candidate input vocabularies that do not include the particular text token may comprise generating each first candidate input vocabulary by: generating a random ordering of the plurality of text tokens in the initial vocabulary; and selecting the plurality of text tokens that precede the particular text token in the random ordering for inclusion in the first candidate input vocabulary. Generating a random ordering may comprise applying a random permutation to an initial ordering of the plurality of text tokens.

Determining a score for the particular text token may comprise: for each of the plurality of first candidate input vocabularies: determining a first performance measure that measures a performance on the one or more text processing tasks of the second machine learning model when trained with the first candidate input vocabulary; determining a second performance measure that measures performance on the one or more text processing tasks of the second machine learning model when trained with the corresponding second candidate input vocabulary; and determining a difference between the first performance measure and the second performance measure.

Determining a score for the particular text token may further comprise: computing an average of the differences for the plurality of first candidate input vocabularies.

Selecting the input vocabulary based on the scores for the particular text tokens may comprise: selecting, as the text tokens in the input vocabulary, a threshold number of text tokens having the highest scores.

The first machine learning model may be the same as the second machine learning model. Alternatively, the second machine learning model may be a different machine learning model from the first machine learning model that is less computationally expensive than the first machine learning model.

The text processing task may be a text-to-speech task. As such, the selection of an input vocabulary may comprise training the second machine learning models to perform the text-to-speech task. The second machine learning models may each be configured to receive an input comprising text in one or more natural languages and to generate an output that defines an audio signal representing the input text being spoken in the one or more natural languages. Subsequent to the selection of the input vocabulary, the first machine learning model may be trained to perform the text-to-speech task on the training data set using the selected input vocabulary. The first machine learning model may also be configured to receive an input comprising text in one or more natural languages and to generate an output that defines an audio signal representing the input text being spoken in the one or more natural languages. The training data set may comprise input text and a corresponding target audio output signal for the input text.

The text processing task may be a machine translation task. As such, the selection of an input vocabulary may comprise training the second machine learning models to perform the machine translation task. The second machine learning models may each be configured to receive an input comprising a sequence of text tokens in a first language and to generate an output sequence of text tokens in a second language that represents a translation of the input sequence into the second language. Subsequent to the selection of the input vocabulary, the first machine learning model may be trained to perform the machine translation task on the training data set using the selected input vocabulary. The first machine learning model may also be configured to receive an input comprising a sequence of text tokens in a first language and to generate an output sequence of text tokens in a second language that represents a translation of the input sequence into the second language. The training data set may comprise an input text sequence in the first language and a corresponding target text sequence in the second language for the input text sequence.

The size of the input vocabulary may be selected based on an amount of memory allocated on a target device for deployment of the first machine learning model trained on the input vocabulary. The method may further comprise training the first machine learning model using the input vocabulary for later deployment on the target device. The method may further comprise deploying the trained first machine learning model on the target device. The amount of memory allocated on the target device may be less than the amount of memory required for deploying the first machine learning model when the entirety of the initial vocabulary is used as the input vocabulary. That is, when no vocabulary selection is performed to reduce the size of the initial vocabulary. For example, the target device may have limited memory and may be constrained to a vocabulary size that is much less than the initial vocabulary size. The target device may be a mobile device. The method may further comprise receiving a plurality of text segments and encoding the plurality of text segments using the input vocabulary. The encoding may occur during training and/or during deployment.

Particular embodiments of the subject matter described in this specification can be implemented so as to realize one or more of the following advantages.

Many high-performing text processing methods, e.g., NLP methods, use deep neural networks that require a pre-defined vocabulary to vectorise and encode text. In large text datasets, the vocabulary size can grow to hundreds of thousands of words, and having an embedding space over the entire vocabulary results in models that are expensive in terms of memory required to store the model and in terms of compute, e.g., processor cycles and compute time, required to perform inference. Many of the words in the vocabulary are not crucial to task performance, and can be removed without a significant drop in final task performance. It is thus known to use heuristics such as frequency or TF-IDF to reduce vocabulary size. However, reducing the vocabulary size with a heuristic such as frequency is often not optimal. For example, many of the words that are left in the vocabulary can be largely unimportant for the task being performed. The described techniques instead reduce the vocabulary size by computing approximations of power indices for the words (or subwords or other text tokens) in the input vocabulary. Reducing the vocabulary size using the described techniques results in a higher performing model given the same vocabulary size as conventional approaches or can attain the same performance as conventional approaches with a significantly smaller vocabulary size. Therefore, the described techniques result in machine learning models that are computationally efficient (in terms of memory and compute) while still achieving high quality performance on the target set of tasks.

More specifically, when the machine learning model is deployed for inference, i.e., for generating predictions for new text segments, on a particular set of one or more devices, there will be a particular amount of memory allocated for the model on the set of one or more devices. That is, the machine learning model will be allocated a specific memory budget, e.g., depending on the available memory on the particular device and optionally other constraints. Given that the number of parameters of the model is otherwise fixed, this generally defines a target input vocabulary size that is smaller than the number of unique tokens in the training data on which the model is being trained. That is, in order to deploy the model on the device(s) while staying within the memory budget (that is specified by the particular hardware constraints of the device(s), the machine learning model must use an input vocabulary that does not include all of the tokens in the training data. This specification describes techniques for selecting a proper subset of these unique tokens such that (i) the size of the vocabulary, i.e., the number of unique tokens in the vocabulary, satisfies the memory budget and the machine learning model can be deployed on the one or more devices while (ii) minimizing the impact on inference quality of the trained model.

As another example, when, after training, the model is deployed in a client-server system or other multi-device system that requires that some or all of the parameters of the model be transmitted over a network, the described techniques can result in reduced bandwidth usage for the transmission while maintaining inference quality, i.e., because the reduced vocabulary size reduces the number of parameters of the model.

As a particular example, text to speech systems, i.e., systems that receive a text sequence of text tokens and generate as output speech data that is a verbalization of the text sequence, are frequently deployed on computing devices that have limited computational resources, i.e., devices that have limited memory and limited processing power, but that are required to return responses with low latency. Examples of such devices include edge devices, e.g., personal assistant devices like smart speakers or mobile devices. By using the described techniques, the memory footprint of the trained model can be reduced such that the model can be deployed on one of these devices and can return speech data with low latency while maintaining high quality performance, i.e., while still generating speech that accurately verbalizes the received text sequence.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
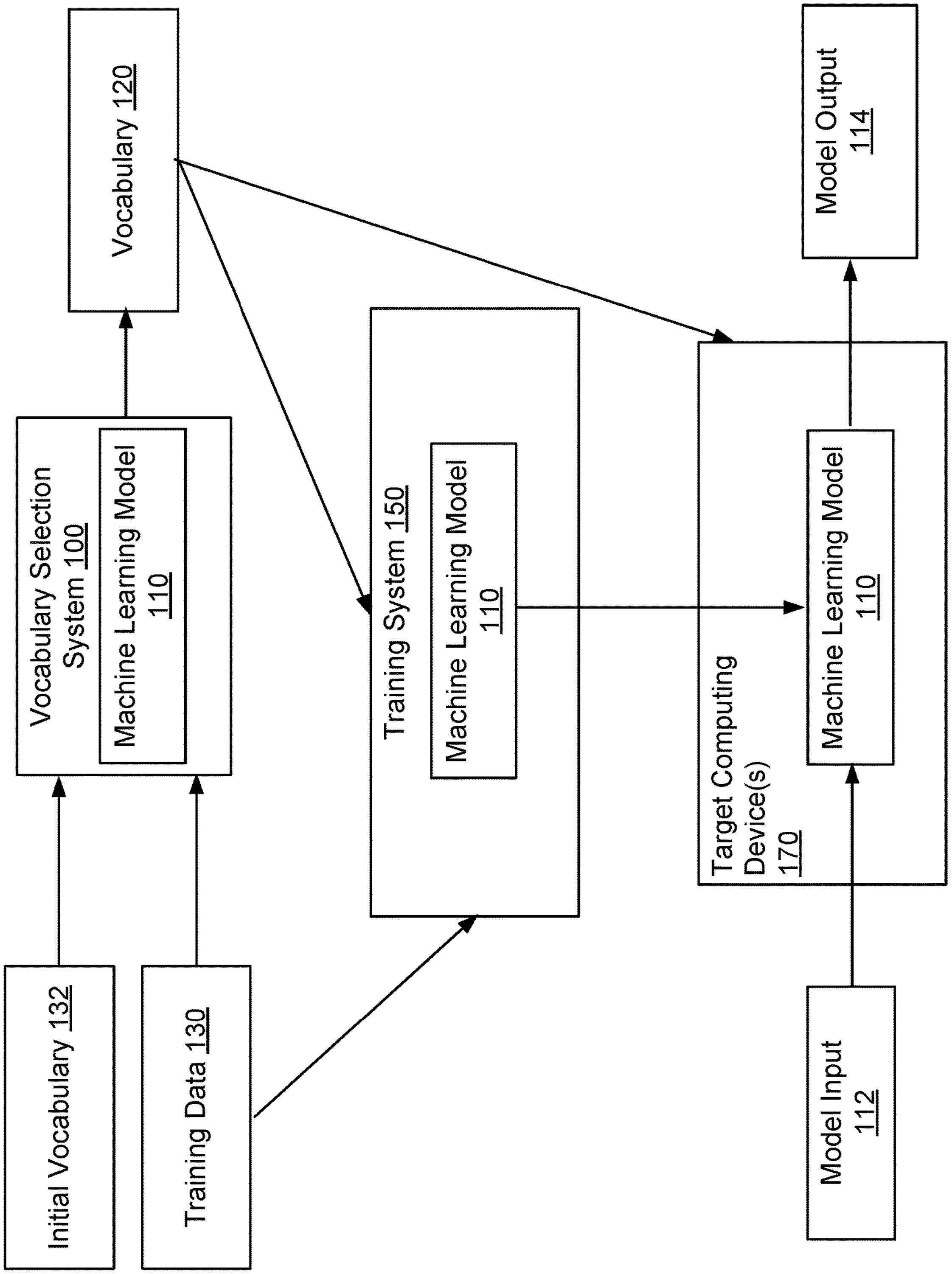
FIG. 1 shows an example vocabulary selection system.

FIG. 1 shows an example vocabulary selection system 100. The vocabulary selection system 100 is an example of a system implemented as computer programs on one or more computers in one or more locations, in which the systems, components, and techniques described below can be implemented.

The system 100 selects an input vocabulary 120 for a machine learning model 110 that will be trained to perform one or more text processing tasks.

After training, the system 100 or a different inference system can use the trained model to perform inference for the one or more text processing tasks, i.e., to receive model inputs 112 and to process each of the model inputs 112 to generate respective model outputs 114 for the one or more text processing tasks for each of the model inputs 112.

In other words, after training, the machine learning model 110 is deployed on a target set of one or more computing devices 170 and used to perform the one or more text processing tasks.

In some cases, the machine learning model 110 is a single-task machine learning model that performs a single text processing task.

In some other cases, the machine learning model 110 is a multi-task machine learning model that is trained through multi-task learning to perform multiple text processing tasks.

The text processing task(s) can be any of a variety of text processing tasks that can be performed by a machine learning model and that require processing a text segment that includes a plurality of text tokens, e.g., words or wordpieces, to generate a predicted output.

As one example, the text processing task can be machine translation. In this example, if the input to the model 110 represents a sequence of text tokens in one language, the output generated by the model 110 represents a sequence of text tokens in another language that represents a translation of the input sequence into the other language.

As another example, the task can be a natural language processing or understanding task, e.g., an entailment task, a paraphrase task, a textual similarity task, a sentiment task, a sentence completion task, a grammaticality task, a document classification task, and so on, that operates on a sequence of text tokens in some natural language to generate an appropriate output. As a particular example, the output for the document classification task can classify an input text segment, e.g., phrase, sentence, paragraph, or full document, into one of multiple classes.

As another example, the task can be a text to speech task, where the input is text in a natural language and the output is a spectrogram or other data defining audio of the text being spoken in the natural language.

The machine learning model 110 can have any appropriate architecture that allows the machine learning model 110 to process a model input 112 that includes one or more text segments to perform the one or more text processing tasks on the model input 112 to generate a model output 114.

For example, the machine learning model 110 can be a linear regression model or other generalized linear model that receives encoded representations, e.g., one hot encoded representations, of the text tokens in the model input and processes the encoded representations, e.g., by generating a weighted combination of the encoded representations, to generate a respective output for each of the tasks.

As another example, the machine learning model 110 can be a deep neural network that receives the encoded representations and uses the encoded representations to compute an embedding of each of the text tokens in the model input. The deep neural network then processes the embeddings through multiple neural network layers to generate the respective outputs for each of the tasks. One example of such a model is a Transformer neural network, i.e., a neural network that applies self-attention over the tokens in the model input 112 as part of generating the model output 114. Another example of such a model is a recurrent neural network (RNN), i.e., a neural network that processes the tokens over multiple time steps and updates an internal state at each time step.

The input vocabulary 120 defines how text tokens are represented in the model input 112 to the machine learning model 110.

Generally, when a text token is in the input vocabulary 120 for the machine learning model 110, the text token is represented as a unique token, i.e., as a token that is unique to the text token and that distinguishes the text token from the other text tokens in the input vocabulary 120, in the model input 112 to the machine learning model 110. In other words, the encoded representation for the text token uniquely identifies the text token.

On the other hand, when a text token is not in the input vocabulary 120 for the machine learning model 110, the text token is represented by a single, shared token, i.e., as a token that is shared between all of the text tokens that are not in the input vocabulary 120 and only identifies that that the text token is not in the input vocabulary 120 rather than uniquely identified the text token, in the model input 112 to the machine learning model 110. In other words, the encoded representation for the text token does not uniquely identify the token and instead merely indicates that the token is some token that is not present in the input vocabulary 120. That is, the same encoded representation is used for all text tokens that are not in the vocabulary 120.

The system 100 selects the input vocabulary 120, i.e., selects the text tokens that will be included in the input vocabulary 120, prior to the machine learning model 110 being trained, i.e., by the system 100 or by another training system 150.

The size of the input vocabulary 120 defines how much memory is consumed by the machine learning model 110 and how computationally intensive both training of the machine learning model 110 and performing inference using the trained model 110 are. In particular, the larger the vocabulary 120, the more parameters that are required to be stored to process unique representations. For example, for models like deep neural networks that have embedding layers that map each unique token to a respective embedding vector, the size of the input vocabulary determines how many unique embedding vectors need to be stored to perform inference using the machine learning model 110. For large vocabulary sizes, the amount of memory required to store the embedding vectors constitutes a large fraction of the total memory consumed by the machine learning model 110.

In particular, the system 100 obtains a target size for the input vocabulary and a training data set 130 that includes a plurality of text segments, e.g., phrases, sentences, paragraphs, or whole documents in one or more natural languages. Each text segment includes one or more text tokens, e.g., words or subwords, that are each selected from an initial vocabulary of text tokens in the one or more natural languages. For example, the initial vocabulary can include each word or subword that appears at least once in the training data set.

The target size for the input vocabulary, i.e., the target number of tokens in the vocabulary, can be determined based on the amount of memory that will be allocated to the machine learning model 110 on the one or more target computer devices 170 on which the model 110 will be deployed after training. That is, the target size for the input vocabulary can be determined based on the amount of memory that is available on the target devices for storing the parameters of the model 110 that are dependent on the size of the vocabulary, e.g., the memory available for storing the embedding vectors for text tokens in the vocabulary.

The system 100 then selects the input vocabulary 120, i.e., determines which tokens from the initial vocabulary should be in the input vocabulary 120 such that the input vocabulary 120 has the target size using the training data set 130.

In particular, the system 100 selects the input vocabulary 120 by assigning a respective score to each of a plurality of text tokens from the initial vocabulary 132 using the training data set 130 and then selecting the target number of text tokens for inclusion in the input vocabulary 120 using the respective scores.

Selecting the input vocabulary 120 is described in more detail below with reference to FIGS. 2 and 3.

Once the system 100 has selected the input vocabulary 120, a training system 150 trains the machine learning model 110 on the training data 130 with the selected input vocabulary 120, i.e., with the tokens in the input vocabulary 120 being mapped to unique representations and the remainder of the tokens in the training data 130 being mapped to a shared representation.

The training system 150 can be implemented as computer programs on the same set of computers as the system 100 or on a different set of one or more computers from the system 100.

In particular, the training system 150 trains the model 110 to optimize an appropriate objective function for the one or more text processing tasks using a conventional machine learning technique, e.g., a gradient descent based technique.

Once the training system 150 has trained the machine learning model 110, the system 100, the training system 150, or a different inference system can deploy the trained machine learning model 110 on the target devices 170 for performing inference with the selected input vocabulary 120.

Figure 2:
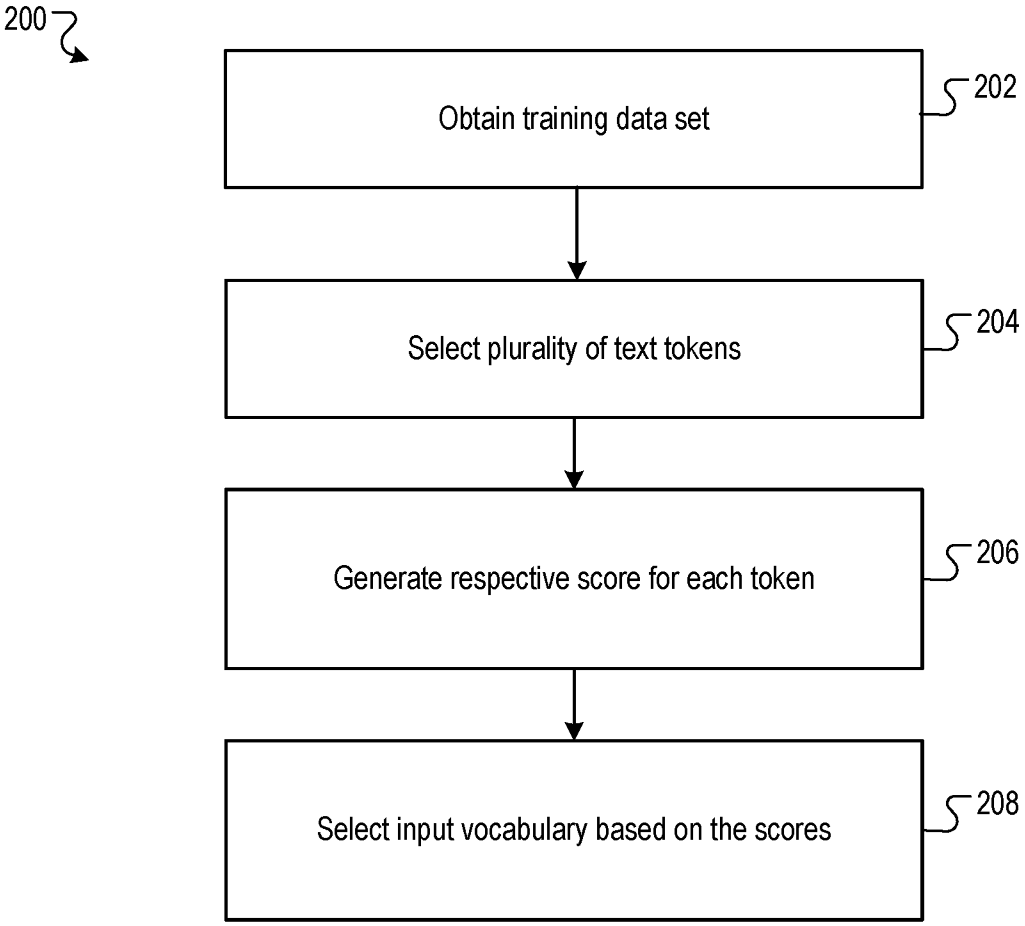
FIG. 2 is a flow diagram of an example process for selecting an input vocabulary.

FIG. 2 is a flow diagram of an example process 200 for selecting an input vocabulary. For convenience, the process 200 will be described as being performed by a system of one or more computers located in one or more locations. For example, a vocabulary selection system, e.g., the vocabulary selection system 100 of FIG. 1, appropriately programmed, can perform the process 200.

The system obtains a training data set that includes a plurality of text segments, e.g., phrases, sentences, paragraphs, or whole documents in one or more natural languages (step 202). Each text segment includes one or more text tokens, e.g., words or subwords, that are each selected from an initial vocabulary of text tokens in the one or more natural languages. For example, the initial vocabulary can include each word or subword that appears at least once in the training data set.

The system selects a plurality of text tokens from the initial vocabulary (step 204).

In some implementations, the system selects all of the text tokens in the initial vocabulary.

In some other implementations, the system can perform one or more pre-filtering steps to filter out some of the text tokens in the initial vocabulary. For example, the system can rank the text tokens based on one or more heuristics and then select a threshold number of text tokens based on the ranking, e.g., select a threshold number of highest ranked tokens, as the plurality of tokens.

The one or more heuristics can include any of a variety of heuristics that measure the relative importance of a given text token to the initial vocabulary.

As one example, the one or more heuristics can include term frequency (TF), i.e., the number of times that the token occurs in the initial vocabulary.

As another example, the one or more heuristics can include term frequency—inverse document frequency (TF-IDF), i.e., the product of the term frequency for the text token and the inverse document frequency for the token.

As yet another example, the one or more heuristics can include the coefficients assigned to the text tokens in a linear regression model trained with regularization. More specifically, the system can train a logistic regression model with L1 regularization or another type of regularization that encourages the model to have low weights on some or all of the training data and then sets the value of this heuristic equal to the absolute coefficient of each token in the trained model.

When a single heuristic is used, the system can rank the tokens according the value of the single heuristic. When multiple heuristics are used, the system can, for each token, combine the values of the heuristics, e.g., by computing a sum or a weighted sum of the values, for the token to generate a combined value and then rank the tokens according to the combined values.

Filtering out some of the tokens in the initial vocabulary can improve the computational efficiency of the vocabulary selection process.

The system then generates a respective score (also known as a "power index") for each of the plurality of tokens (step 206). The power index for a given token generally measures the impact on the performance of the trained machine learning model of including the given token in the input vocabulary. For example, the power index may be based upon a Shapley value or Banzhaf index. Generating a power index for a token is described below with reference to FIG. 3.

The system then selects the input vocabulary based on the scores (or "power indices") for the plurality of text tokens (step 208). For example, when the system is required to select an input vocabulary having a fixed size, i.e., having exactly a threshold number of text tokens, the system selects, as the text tokens in the input vocabulary, the threshold number of text tokens having the highest respective scores.

In particular, as described above, the system can receive a target vocabulary size, i.e., a target number of tokens to be included in the vocabulary, that is based on the amount of memory allocated for the trained model on the one or more devices on which the trained model will be deployed. The system can then selected the target number of tokens having the highest scores as the tokens that are included in the input vocabulary.

After the input vocabulary is selected, the system or another system can train the machine learning model to perform the one or more text processing tasks on at least a portion of the training data set, i.e., the system can train the machine learning model on some or all of the training data that was used in selecting the input vocabulary, with the input vocabulary for the first machine learning model set to the selected input vocabulary.

After the machine learning model is trained, the system can provide data specifying the trained first machine learning model and the selected input vocabulary for use in performing inference, e.g., on the one or more target devices, e.g., for generating outputs for the one or more text processing tasks for new text segments that are not in the training data set.

Figure 3:
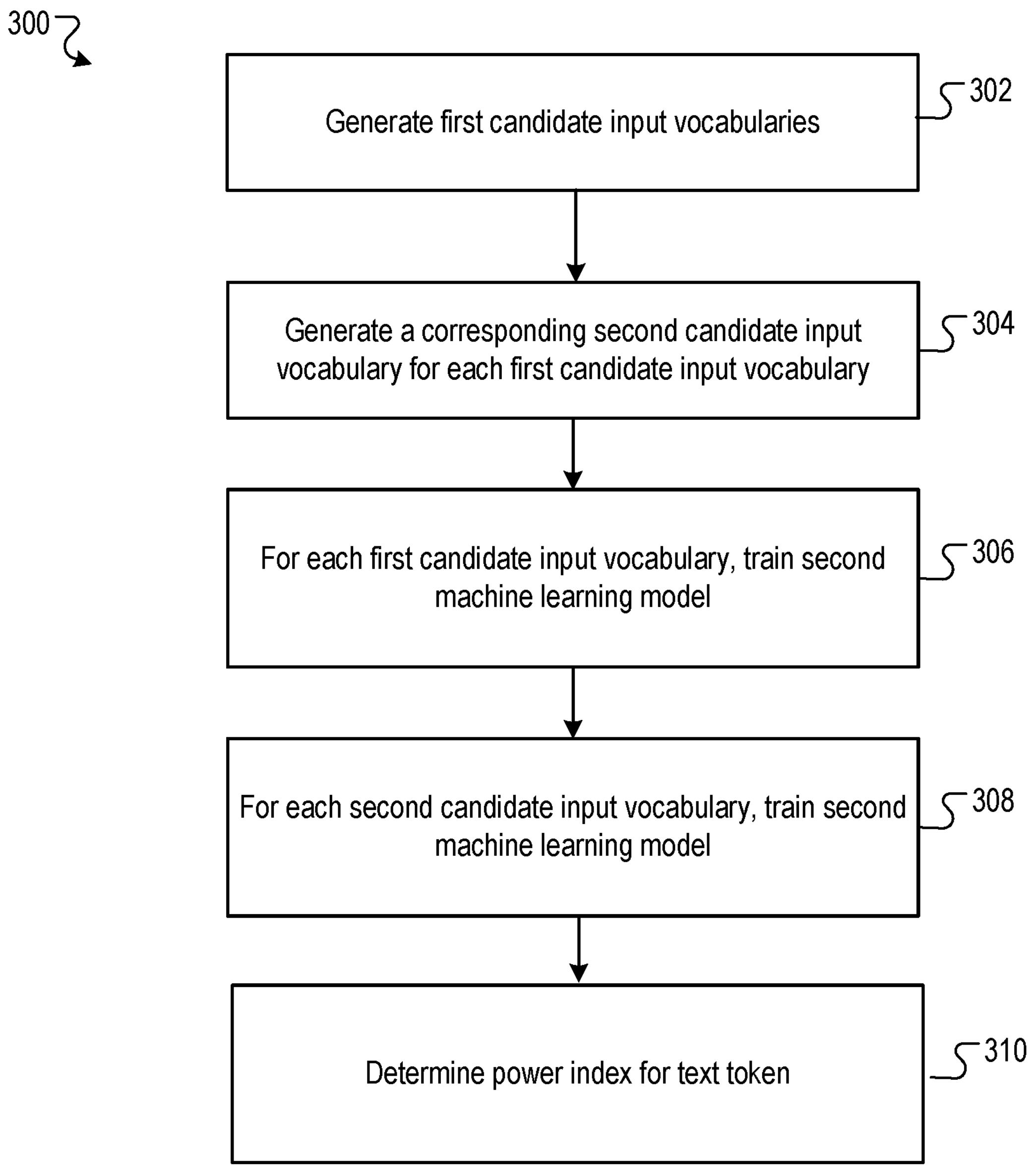
FIG. 3 is a flow diagram of an example process for generating a power index for a particular text token.

FIG. 3 is a flow diagram of an example process 300 for generating a power index for a particular text token. For convenience, the process 300 will be described as being performed by a system of one or more computers located in one or more locations. For example, a vocabulary selection system, e.g., the vocabulary selection system 100 of FIG. 1, appropriately programmed, can perform the process 300.

The system can perform the process 300 for each text token selected in step 204 above to generate a respective power index for each text token.

The system generates plurality of first candidate input vocabularies that do not include the particular text token (step 302). That is, each respective first candidate input vocabulary includes text tokens from the initial vocabulary but does not include the particular text token. It will be appreciated that the skilled person may determine an appropriate number of first candidate input vocabularies to generate. For example, a larger number of candidate input vocabularies may provide a more statistically accurate computation of the power index for the particular text token at a cost of increased computation time.

The system can generate these first candidate input vocabularies in any of a variety of ways.

For example, the system can assign a probability p to each of the text tokens in the initial vocabulary. The probability p can be pre-determined and can be equal to, e.g., 0.5, or a different value that is expected to result in first candidate input vocabularies having a desired size. The desired size may be the same as or different to the target size of the input vocabulary.

The system can then generate each first candidate input vocabulary by sampling in accordance with the probability p, i.e., selecting each of the plurality of tokens for inclusion in the first candidate input vocabulary with probability p.

As another example, the system can generate each first candidate input vocabulary by generating a random ordering of the text tokens in the initial vocabulary and selecting the plurality of text tokens that precede the particular text token in the random ordering for inclusion in the first candidate input vocabulary. To generate a given random ordering, the system can apply a random permutation to an initial ordering of the text tokens in the initial vocabulary. The size of each respective first candidate input vocabulary may vary.

The system generates, for each of the plurality of first candidate input vocabularies, a corresponding second input vocabulary that includes (i) the text tokens in the first candidate input vocabulary and (ii) the particular text token (step 304). In particular, the system generates each second input vocabulary by adding the particular text token to the corresponding first candidate input vocabulary.

For each of the plurality of first candidate input vocabularies, the system trains a second machine learning model to perform the one or more text processing tasks on at least a portion of the training data set with an input vocabulary for the second machine learning model set to the first candidate input vocabulary, i.e., with only text tokens in the candidate input vocabulary represented with unique tokens (step 306).

In some cases, the first machine learning model and the second machine learning model are the same model. That is, the first and second machine learning model may be of the same type and have the same architecture. In some other cases, however, to make the vocabulary selection more computationally efficient, the second machine learning model can be a different machine learning model that also performs the one or more text processing tasks but is less computationally expensive than the first machine learning model. For example, if the final model is a neural network, the second machine learning model can be a neural network with fewer parameters or can be a linear model.

For each of the plurality of second candidate input vocabularies, the system trains the second machine learning model to perform the one or more text processing tasks on at least a portion of the training data set with the input vocabulary for the second machine learning model set to the second candidate input vocabulary, i.e., with only text tokens in the second candidate input vocabulary represented with unique tokens (step 308).

The system then determines a power index for the particular text token that measures a difference between (i) the performance on the one or more text processing tasks of the second machine learning model when trained with the plurality of first candidate input vocabularies that do not include the particular text token and (ii) the performance on the one or more text processing tasks of the second machine learning model when trained with the plurality of second candidate input vocabularies that do include the particular text token (step 310). The performance measure may be an accuracy score, an F-score, a mean reciprocal rank or any other performance measure appropriate to the text processing task(s).

As a particular example, to the compute the power index, the system can, for each of the plurality of first candidate input vocabularies, determine a first performance measure that measures a performance on the one or more text processing tasks of the second machine learning model when trained with the first candidate input vocabulary and determine a second performance measure that measures performance on the one or more text processing tasks of the second machine learning model when trained with the corresponding second candidate input vocabulary. The system can then determine the difference between the first performance measure and the second performance measure.

The system can then determine the power index for the particular text token from these differences, e.g., by computing an average of the differences for the plurality of first candidate input vocabularies.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:

obtaining a training data set comprising a plurality of text segments in one or more natural languages, each text segment comprising one or more text tokens that are each selected from an initial vocabulary of text tokens in the one or more natural languages;

selecting an input vocabulary for a first machine learning model to be trained on the training data set to perform one or more text processing tasks, wherein the input vocabulary is a proper subset of the text tokens in the initial vocabulary, and wherein the text tokens in the input vocabulary are represented as unique tokens in inputs to the first machine learning model, the selecting comprising:

for each particular text token of a plurality of text tokens in the initial vocabulary:

generating a plurality of first candidate input vocabularies that do not include the particular text token;

for each of the plurality of first candidate input vocabularies, generating a corresponding second input vocabulary that includes (i) the text tokens in the first candidate input vocabulary and (ii) the particular text token;

for each of the plurality of first candidate input vocabularies, training a second machine learning model to perform the one or more text processing tasks on at least a portion of the training data set with an input vocabulary for the second machine learning model set to the first candidate input vocabulary;

for each of the plurality of second candidate input vocabularies, training the second machine learning model to perform the one or more text processing tasks on at least a portion of the training data set with the input vocabulary for the second machine learning model set to the second candidate input vocabulary; and determining a score for the particular text token that measures a difference between (i) the performance on the one or more text processing tasks of the second machine learning model when trained with the plurality of first candidate input vocabularies that do not include the particular text token and (ii) the performance on the one or more text processing tasks of the second machine learning model when trained with the plurality of second candidate input vocabularies that do include the particular text token;

selecting the input vocabulary based on the scores for the particular text tokens; and training the first machine learning model to perform the one or more text processing tasks on at least a portion of the training data set with the input vocabulary for the first machine learning model set to the selected input vocabulary.

2. The method of claim 1, wherein the text tokens in the initial vocabulary of text tokens comprise words.

3. The method of claim 1, wherein the text tokens in the initial vocabulary of text tokens comprise subwords.

4. The method of claim 1, wherein the text tokens in the initial vocabulary that are not in the input vocabulary are all represented as a single, shared token in inputs to the first machine learning model.

5. The method of claim 4, wherein the first machine learning model is configured to receive a model input comprising an input text segment and to process the model input to generate an output for the one or more text processing tasks, and wherein:

any text tokens in the input text segment that are in the input vocabulary are represented as unique tokens in the model input; and any text tokens in the input text segment that are not in the input vocabulary are represented as the single, shared token in the model input.

6. The method of claim 1, further comprising:

providing data specifying the trained first machine learning model and the selected input vocabulary for use in generating outputs for the one or more text processing tasks for new text segments that are not in the training data set.

7. The method of claim 1, further comprising:

selecting the plurality of text tokens from the initial vocabulary by filtering out one or more tokens from the text tokens in the initial vocabulary.

8. The method of claim 7, wherein filtering out one or more text tokens comprises:

ranking the text tokens in the initial vocabulary based on one or more heuristics; and selecting a threshold number of text tokens based on the ranking.

9. The method of claim 8, wherein the one or more heuristics include one or more of TF, TF-IDF, or coefficients assigned to the text tokens in the initial vocabulary in a linear regression model trained with regularization.

10. The method of claim 1, wherein generating a plurality of first candidate input vocabularies that do not include the particular text token comprises generating each first candidate input vocabulary by:

assigning a probability p to each of the plurality of text tokens in the initial vocabulary; and selecting tokens for inclusion in the first candidate input vocabulary based on the probability p.

11. The method of claim 10, wherein the probability p assigned to each of the plurality of tokens is 0.5.

12. The method of claim 11, wherein generating a plurality of first candidate input vocabularies that do not include the particular text token comprises generating each first candidate input vocabulary by:

generating a random ordering of the plurality of text tokens in the initial vocabulary; and selecting the plurality of text tokens that precede the particular text token in the random ordering for inclusion in the first candidate input vocabulary.

13. The method of claim 12, wherein generating a random ordering comprises applying a random permutation to an initial ordering of the plurality of text tokens.

14. The method of claim 1, wherein determining a score for the particular text token comprises:

for each of the plurality of first candidate input vocabularies:

determining a first performance measure that measures a performance on the one or more text processing tasks of the second machine learning model when trained with the first candidate input vocabulary;

determining a second performance measure that measures performance on the one or more text processing tasks of the second machine learning model when trained with the corresponding second candidate input vocabulary; and determining a difference between the first performance measure and the second performance measure.

15. The method of claim 14, wherein determining a score for the particular text token further comprises:

computing an average of the differences for the plurality of first candidate input vocabularies.

16. The method of claim 1, wherein selecting the input vocabulary based on the scores for the particular text tokens comprises:

selecting, as the text tokens in the input vocabulary, a threshold number of text tokens having the highest scores.

17. The method of claim 1, wherein the first machine learning model is the same as the second machine learning model.

18. The method of claim 1, wherein the second machine learning model is a different machine learning model from the first machine learning model that is less computationally expensive than the first machine learning model.

19. The method of claim 1, wherein the one or more text processing tasks include a text-to-speech task and wherein the first machine learning model is configured to receive text in a natural language and generate as output audio data defining audio of the text being spoken in the natural language.

20. A system comprising one or more computers and one or more storage devices storing instructions that are operable, when executed by the one or more computers, to cause the one or more computers to perform operations comprising:

obtaining a training data set comprising a plurality of text segments in one or more natural languages, each text segment comprising one or more text tokens that are each selected from an initial vocabulary of text tokens in the one or more natural languages;

selecting an input vocabulary for a first machine learning model to be trained on the training data set to perform one or more text processing tasks, wherein the input vocabulary is a proper subset of the text tokens in the initial vocabulary, and wherein the text tokens in the input vocabulary are represented as unique tokens in inputs to the first machine learning model, the selecting comprising:

for each particular text token of a plurality of text tokens in the initial vocabulary:

generating a plurality of first candidate input vocabularies that do not include the particular text token;

for each of the plurality of first candidate input vocabularies, generating a corresponding second input vocabulary that includes (i) the text tokens in the first candidate input vocabulary and (ii) the particular text token;

for each of the plurality of first candidate input vocabularies, training a second machine learning model to perform the one or more text processing tasks on at least a portion of the training data set with an input vocabulary for the second machine learning model set to the first candidate input vocabulary;

for each of the plurality of second candidate input vocabularies, training the second machine learning model to perform the one or more text processing tasks on at least a portion of the training data set with the input vocabulary for the second machine learning model set to the second candidate input vocabulary; and determining a score for the particular text token that measures a difference between (i) the performance on the one or more text processing tasks of the second machine learning model when trained with the plurality of first candidate input vocabularies that do not include the particular text token and (ii) the performance on the one or more text processing tasks of the second machine learning model when trained with the plurality of second candidate input vocabularies that do include the particular text token;

selecting the input vocabulary based on the scores for the particular text tokens; and training the first machine learning model to perform the one or more text processing tasks on at least a portion of the training data set with the input vocabulary for the first machine learning model set to the selected input vocabulary.

21. One or more non-transitory computer-readable storage media encoded with instructions that, when executed by one or more computers, cause the one or more computers to perform operations comprising:

obtaining a training data set comprising a plurality of text segments in one or more natural languages, each text segment comprising one or more text tokens that are each selected from an initial vocabulary of text tokens in the one or more natural languages;

selecting an input vocabulary for a first machine learning model to be trained on the training data set to perform one or more text processing tasks, wherein the input vocabulary is a proper subset of the text tokens in the initial vocabulary, and wherein the text tokens in the input vocabulary are represented as unique tokens in inputs to the first machine learning model, the selecting comprising:

for each particular text token of a plurality of text tokens in the initial vocabulary:

generating a plurality of first candidate input vocabularies that do not include the particular text token;

for each of the plurality of first candidate input vocabularies, generating a corresponding second input vocabulary that includes (i) the text tokens in the first candidate input vocabulary and (ii) the particular text token;

for each of the plurality of first candidate input vocabularies, training a second machine learning model to perform the one or more text processing tasks on at least a portion of the training data set with an input vocabulary for the second machine learning model set to the first candidate input vocabulary;

for each of the plurality of second candidate input vocabularies, training the second machine learning model to perform the one or more text processing tasks on at least a portion of the training data set with the input vocabulary for the second machine learning model set to the second candidate input vocabulary; and determining a score for the particular text token that measures a difference between (i) the performance on the one or more text processing tasks of the second machine learning model when trained with the plurality of first candidate input vocabularies that do not include the particular text token and (ii) the performance on the one or more text processing tasks of the second machine learning model when trained with the plurality of second candidate input vocabularies that do include the particular text token;

selecting the input vocabulary based on the scores for the particular text tokens; and training the first machine learning model to perform the one or more text processing tasks on at least a portion of the training data set with the input vocabulary for the first machine learning model set to the selected input vocabulary.

22. The system of claim 20, wherein the text tokens in the initial vocabulary that are not in the input vocabulary are all represented as a single, shared token in inputs to the first machine learning model.

* * * * *